United States Patent
Wang et al.

(10) Patent No.: US 12,546,387 B2
(45) Date of Patent: Feb. 10, 2026

(54) GEARBOX

(71) Applicant: Robert Bosch GmbH, Stuttgart (DE)

(72) Inventors: Minzhu Wang, Jiangsu (CN); Feng Lu, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/851,519

(22) PCT Filed: Mar. 9, 2023

(86) PCT No.: PCT/EP2023/056010
§ 371 (c)(1),
(2) Date: Sep. 26, 2024

(87) PCT Pub. No.: WO2023/186483
PCT Pub. Date: Oct. 5, 2023

(65) Prior Publication Data
US 2025/0215966 A1    Jul. 3, 2025

(30) Foreign Application Priority Data
Apr. 1, 2022 (CN) .......................... 202210347966.7

(51) Int. Cl.
*F16H 57/02* (2012.01)
*F16H 57/021* (2012.01)
*F16H 57/04* (2010.01)

(52) U.S. Cl.
CPC ....... *F16H 57/021* (2013.01); *F16H 57/0423* (2013.01); *F16H 57/0424* (2013.01); *F16H 57/0471* (2013.01)

(58) Field of Classification Search
CPC ............... F16H 57/021; F16H 57/0421; F16H 57/0423; F16H 57/0424; F16H 57/0471
See application file for complete search history.

(56) References Cited

U.S. PATENT DOCUMENTS

| | | | |
|---|---|---|---|
| 8,261,883 B2 * | 9/2012 | Ariga ................. | F16H 57/0423 474/1 |
| 11,421,777 B2 * | 8/2022 | Sung .................. | F16H 57/0471 |

(Continued)

FOREIGN PATENT DOCUMENTS

| | | | | |
|---|---|---|---|---|
| CN | 110107679 A | * | 8/2019 | ......... F16H 57/0421 |
| CN | 111609119 A | * | 9/2020 | ........... F16H 57/023 |

(Continued)

OTHER PUBLICATIONS

International Search Report corresponding to PCT Application No. PCT/EP2023/056010, mailed May 17, 2023. (4 pages).

*Primary Examiner* — Adam D Rogers
(74) *Attorney, Agent, or Firm* — Maginot, Moore & Beck LLP

(57) ABSTRACT

A gearbox includes a pair of housings which are respectively provided with a bearing block protruding axially from an inner surface thereof. A radial inner surface of the bearing block defines a bearing chamber for accommodating a bearing. At least one of the housings being provided with a lubricating assembly on the inner surface thereof. The lubricating assembly includes (i) an oil deflector having a radial segment extending from a radial outer surface of the bearing block in a direction away from the radial outer surface, and a circumferential segment extending from the radial segment along the radial outer surface, and (ii) a middle oil guide rib intersecting with the radial outer surface of the bearing block and being provided with, at the intersection, an oil inlet hole providing access to the bearing chamber of the bearing block. The oil inlet hole is located on a lower side of the oil deflector. The circumferential segment extends towards the oil inlet hole. And a portion of the middle oil guide rib adjacent to the oil inlet hole is located on an upper side of the oil inlet hole.

10 Claims, 6 Drawing Sheets

(56) References Cited

U.S. PATENT DOCUMENTS

| | | | |
|---|---|---|---|
| 11,549,581 B2 * | 1/2023 | Matsui | F16H 57/0471 |
| 11,578,798 B2 * | 2/2023 | Nakata | F16H 57/0436 |
| 12,049,952 B2 * | 7/2024 | Tamura | F16H 57/045 |
| 12,078,238 B2 * | 9/2024 | Nakawatari | F16H 57/0471 |
| 2020/0393039 A1 | 12/2020 | Matsui et al. | |

FOREIGN PATENT DOCUMENTS

| | | | | |
|---|---|---|---|---|
| CN | 112065875 A | * | 12/2020 | F16H 57/045 |
| CN | 112576732 A | * | 3/2021 | B60K 6/445 |
| CN | 215861664 U | * | 2/2022 | |
| CN | 216975732 U | | 7/2022 | |
| CN | 116877668 A | * | 10/2023 | F16H 57/02 |
| CN | 116928328 A | * | 10/2023 | F16H 57/042 |
| CN | 119084563 A | * | 12/2024 | F16H 57/02 |
| EP | 3869070 A1 | | 8/2021 | |

* cited by examiner

US 12,546,387 B2

GEARBOX

This application is a 35 U.S.C. § 371 National Stage Application of PCT/EP2023/056010, filed on Mar. 9, 2023 which claims the benefit of priority to Serial No. CN 2022 1034 7966.7, filed on Apr. 1, 2022 in China, the disclosures of which are incorporated herein by reference in their entirety.

TECHNICAL FIELD

The present utility model relates to the technical field of mechanical transmission, and more particularly, relates to a gearbox.

BACKGROUND

A gearbox is a common transmission device that generally changes parameters, such as a torque transmitted from a driving shaft to a driven shaft, a rotating speed, and a movement direction, under different operating conditions. Conventional gearboxes generally adopt a splash lubrication method, i.e., a certain amount of lubricating oil is stored in a gearbox housing, lubricating oil liquid is rolled up to be splashed onto relevant parts needing to be lubricated, such as a gear, a shaft and a bearing, when a gear pair of the gearbox rotates. However, because the structure of the gearbox is generally complex, there are several blind zones of lubrication that cannot be sufficiently lubricated, e.g., a bearing contained in the housing. Particularly, when the gear pair operates at a high speed, splash lubrication usually cannot meet lubrication requirements of the blind zones of lubrication, thereby directly causing low lubrication efficiency, and shortening the service life of relevant parts. In order to address this problem, the existing technologies for designing a lubrication system of a gearbox mostly adopts a solution of mounting an additional device in the gearbox. Although the device can solve the lubrication problem to a certain extent, it increases the weight of the gearbox and the complexity of assembling, and also reduces the space in the gearbox and deteriorates heat dissipation performance, thereby affecting the overall efficiency of the gearbox.

Accordingly, there is a need to provide a lubrication system for a gearbox, which solves the problem that it is difficult for lubricating blind zones in the gearbox to obtain sufficient lubricating oil basically without increasing the weight of the gearbox and reducing the internal space of the gearbox.

SUMMARY

In order to solve the problems in the prior art described above, the present utility model proposes a gearbox, comprising a pair of housings, the pair of housings being respectively provided with a bearing block protruding axially from an inner surface thereof, a radial inner surface of the bearing block defining a bearing chamber for accommodating a bearing, and at least one of the housings being provided with a lubricating assembly on the inner surface thereof, wherein the lubricating assembly comprises an oil deflector having a radial segment extending from a radial outer surface of the bearing block in a direction away from the radial outer surface, and a circumferential segment extending from the radial segment along the radial outer surface; and a middle oil guide rib intersecting with the radial outer surface of the bearing block and being provided with, at the intersection, an oil inlet hole providing access to the bearing chamber, wherein the oil inlet hole is located on a lower side of the oil deflector, the circumferential segment extends towards the oil inlet hole, and a portion of the middle oil guide rib adjacent to the oil inlet hole is located on an upper side of the oil inlet hole.

According to an optional embodiment of the present utility model, the axial width of the oil deflector is greater than the axial width of the bearing block.

According to an optional embodiment of the present utility model, the circumferential segment of the oil deflector is spaced apart from the oil inlet hole.

According to an optional embodiment of the present utility model, a portion of the bearing chamber adjacent to a bottom thereof forms an oil collecting chamber for accommodating lubricating oil, and the oil inlet hole provides access to the oil collecting chamber.

According to an optional embodiment of the present utility model, the radial inner surface of the bearing block is provided with a recess, and the recess defines an auxiliary chamber in fluid communication with the oil inlet hole and the oil collecting chamber.

According to an optional embodiment of the present utility model, the bearing block is a first bearing block, the oil inlet hole is a first oil inlet hole, the pair of housings are further respectively provided with a second bearing block axially protruding from the inner surface thereof, the middle oil guide rib further intersects with a radial outer surface of the second bearing block, and is provided with, at the intersection, a second oil inlet hole providing access to a bearing chamber of the second bearing block, and a portion of the middle oil guide rib adjacent to the second oil inlet hole is located on an upper side of the second oil inlet hole.

According to an optional embodiment of the present utility model, the middle oil guide rib extends upwardly from the first oil inlet hole to the second oil inlet hole and extends upwardly from the second oil inlet hole to a tail end.

According to an optional embodiment of the present utility model, the middle oil guide rib has a protruding portion, and the middle oil guide rib extends upwardly from the first oil inlet hole to the protruding portion and extends downwardly from the protruding portion to the second oil inlet hole.

According to an optional embodiment of the present utility model, the lubricating assembly further comprises a side oil guide rib, the side oil guide rib intersects with the radial outer surface of the second bearing block and is provided with, at the intersection, a third oil inlet hole providing access to the bearing chamber of the second bearing block, and the side oil guide rib extends upwardly from the third oil inlet hole.

According to an optional embodiment of the present utility model, the lubricating assembly is an integrated part of the housing.

The present utility model can be embodied as a schematic embodiment in the accompanying drawings. It should be noted, however, that the drawings are merely illustrative and any variations contemplated under the teachings of the present utility model should be considered to be included within the scope of the present utility model.

BRIEF DESCRIPTION OF THE DRAWINGS

The accompanying drawings show exemplary embodiments of the present utility model. These drawings should not be construed as necessarily limiting the scope of the present utility model. In the drawings.

DETAILED DESCRIPTION

Figure 1:
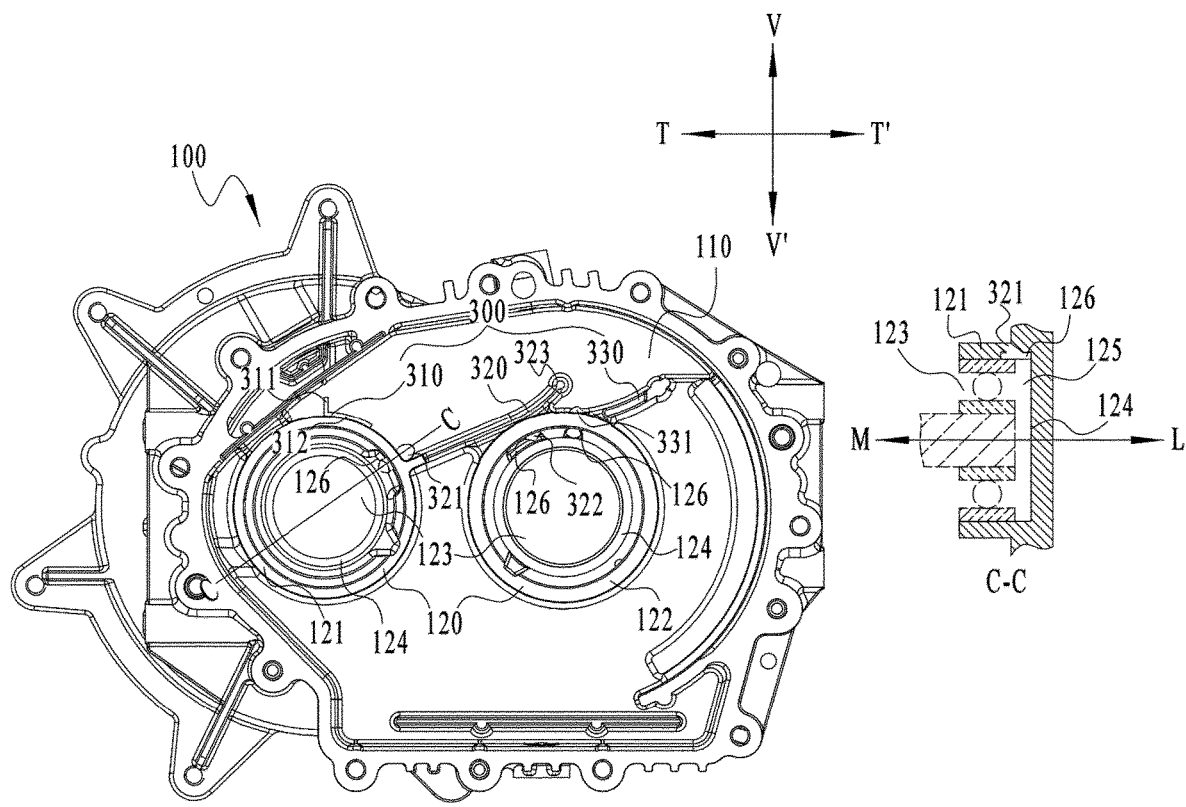
FIG. 1 is a schematic front view of a front housing of a gearbox according to the present utility model.

Further features and advantages of the present utility model will become more apparent from the following description with reference to the accompanying drawings. Exemplary embodiments of the present utility model are shown in the accompanying drawings, and the various drawings are not necessarily drawn according to the actual scale. However, the present utility model may be implemented as many different forms and should not be construed as necessarily being limited to the exemplary embodiments shown and disclosed here. Rather, these exemplary embodiments are provided merely for illustrating the present utility model and conveying the spirit and essence of the present utility model to those skilled in the art.

The present utility model is intended to propose a gearbox with an improved lubricating assembly. The lubricating assembly has a novel arrangement, and thus lubricating oil can be guided to lubricated sites in the gearbox, particularly, the lubricating oil can be reliably guided to lubricating blind zones in the gearbox (e.g., an inner end face and an outer end face of a bearing, etc.) to reduce the failure of parts such as a gear, a bearing, etc., thereby prolonging the service life of the part and improving the transmission efficiency. In addition, the lubricating assembly is integrally joined to the inner wall of a housing of the gearbox. In other words, the lubricating assembly is manufactured (particularly, by casting, three-dimensional printing, machining, and other machining processes) as an integrated part of the housing of the gearbox, and thus compared with an existing lubricating mode that a separate oil guide plate is additionally mounted on the inner wall of the housing of the gearbox, the lubricating assembly of the gearbox according to the present utility model may be able to simplify processes of manufacturing and assembling to reduce the production cost. In the other aspect, resistance to adverse factors, such as vibration, abrasion, etc. generated during the work process of the gearbox is higher, which not only improves the reliability of the gearbox, but also prolongs the service life thereof.

Various optional embodiments of the gearbox according to the present utility model are described in detail below in conjunction with the drawings. It should be noted that new embodiments obtained by combining the features of these optional embodiments in any way also fall within the protection scope of the present utility model without mutual contradiction. In the various drawings, the vertical direction is indicated by arrows VV' with an arrow V pointing directly above (i.e., vertically above) and an arrow V' pointing directly below (i.e., vertically below). The lateral direction is indicated by arrows TT' with an arrow T pointing to the left and an arrow T' pointing to the right. The inner-outer direction is indicated by arrows ML with an arrow M pointing to the inner side and an arrow L pointing to the outer side. Of course, the lateral direction TT' and the inner-outer direction ML may be understood as a horizontal direction, respectively. It should be noted, however, that these positional terms used herein are merely intended to describe the relative positional relationship of various parts more visually in conjunction with the drawings, rather than to describe the absolute orientations of various parts, so these positional terms should not be construed in any way as limiting the scope of protection of the present utility model.

Referring to FIGS. 1-6, schematic front views and schematic three-dimensional views of a front housing and rear housing of a gearbox according to the present utility model are shown. As shown in FIGS. 1-6, a gearbox according to the present utility model has a pair of housings 100 and 200, i.e., the front housing 100 and the rear housing 200. The front housing 100 and the rear housing 200 are intended to be fixed together by fasteners, such as bolts, nuts, etc., so that an inner surface 110 of the front housing 100 and an inner surface 210 of the rear housing 200 together define an internal chamber within the housing for accommodating parts such as a driving gear, a driven gear, a shifting fork, etc. It should be noted that the above mentioned inner side M refers to a direction close to the internal chamber, while the outer side L refers to a direction away from the internal chamber. A transmission shaft of the gearbox, e.g., a driving shaft (also referred to as an input shaft) and a driven shaft (also referred to as an output shaft), may be inserted into the internal chamber by passing through an opening formed in the front housing 100 and/or the rear housing 200 so as to be coupled to the driving gear and the driven gear, respectively. After the assembly is completed, the driving shaft may transmit power to the driven shaft at a certain gear ratio through the driving gear and the driven gear meshed together. In order to rotatably position the driving shaft and the driven shaft in the gearbox, both ends of the driving shaft and the driven shaft are each provided with a bearing, while bearing blocks for accommodating the bearings are disposed in the front housing 100 and the rear housing 200.

Figure 2:
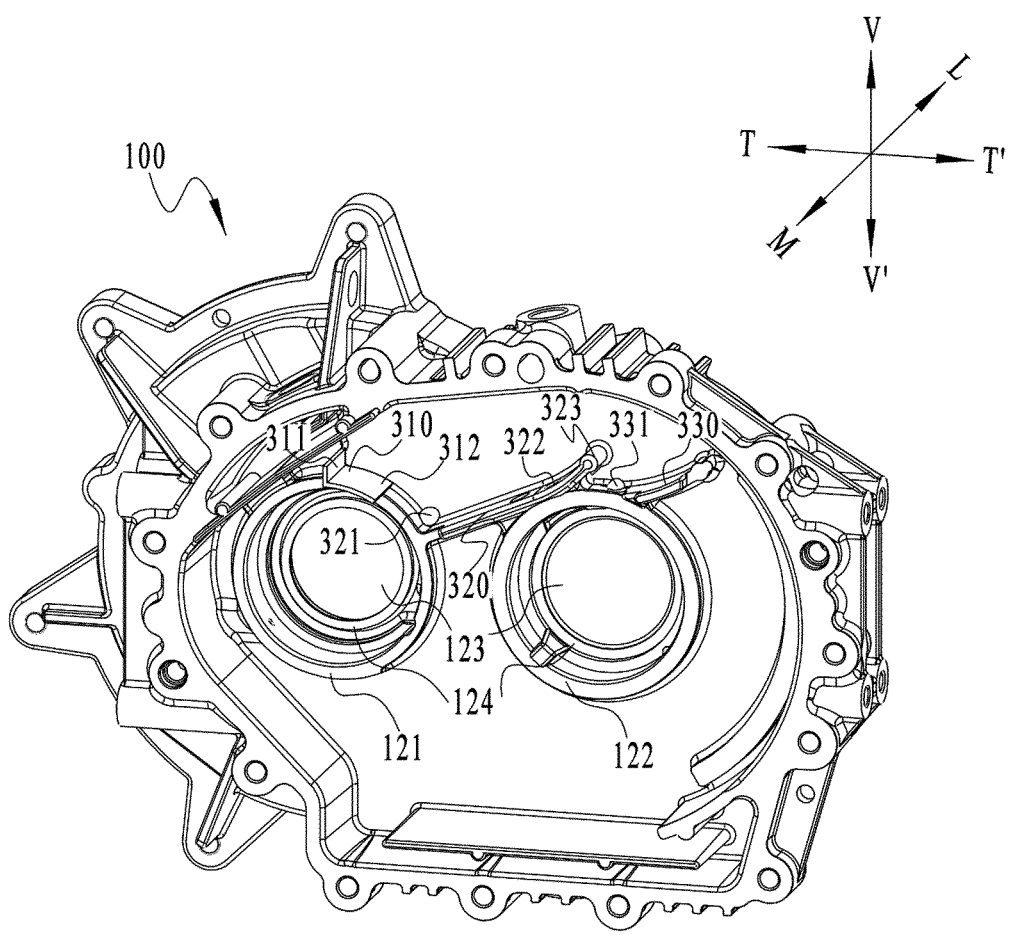
FIG. 2 is a schematic three-dimensional view of the front housing of the gearbox according to the present utility model.
Figure 3:
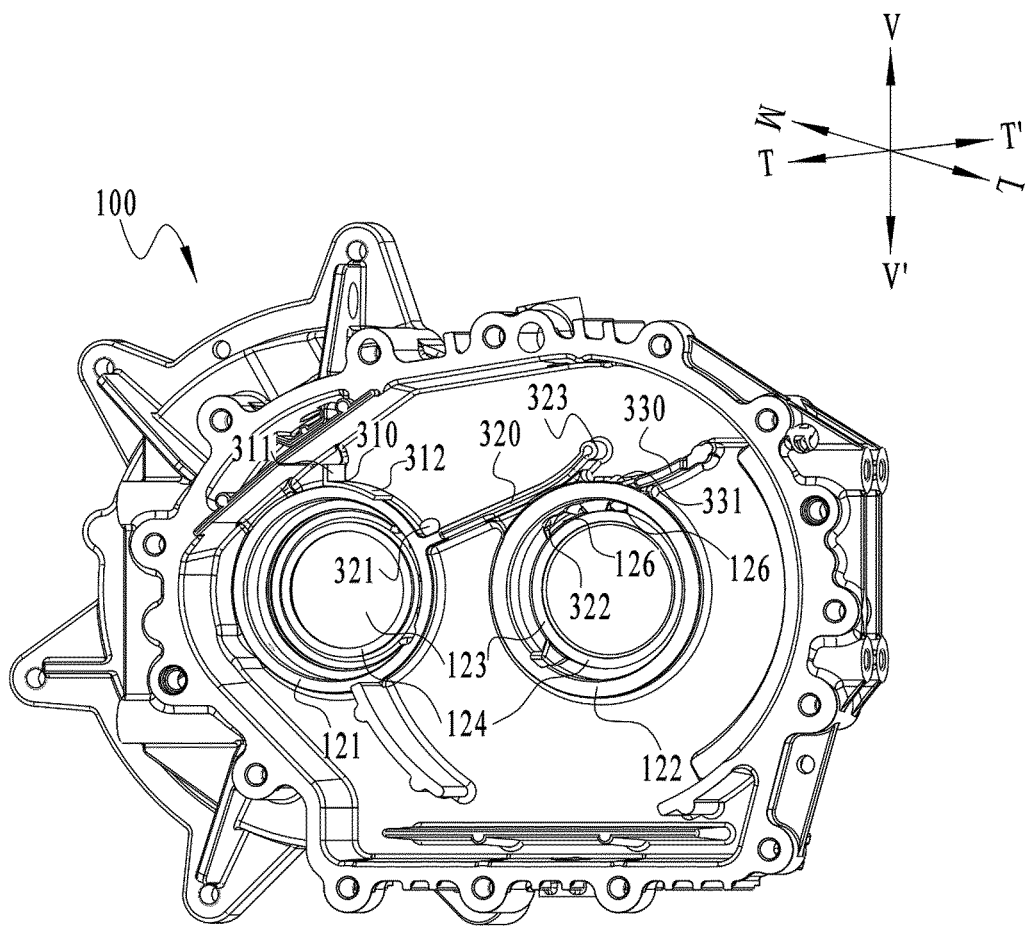
FIG. 3 is another schematic three-dimensional view of the front housing of the gearbox according to the present utility model.

As shown in FIGS. 1-3, a schematic front view and schematic three-dimensional views of the front housing of the gearbox according to the present utility model are shown. The front housing 100 may be provided with at least two generally circular bearing blocks 120 (e.g., a first bearing block 121 for accommodating a front bearing of the driving shaft and a second bearing block 122 for accommodating a front bearing of the driven shaft) protruding from the inner surface 110 thereof in the inner-outer direction ML. Each bearing block 120 defines a bearing chamber 123 therein, and the bearing chamber 123 is open to the inner side M so as to receive the bearing from the inner side M. In particular, the bearing chamber 123 may also be recessed into the inner surface 110 of the front housing 100 toward the outer side L so that a bottom 124 of the bearing chamber 123 deviates towards the outer side L with respect to the inner surface 110 of the front housing 100. In particular, the bottom 124 of the bearing chamber 123 may be provided with an opening to allow a corresponding transmission shaft to pass through the opening to be inserted into the gearbox from the exterior of the gearbox. After the bearing is assembled into the bearing chamber 123, one end of the bearing faces the internal chamber of the gearbox to be formed, and thus may be referred to as an inner end, while the other end of the bearing faces the bottom 124 of the bearing chamber 123, and thus may be referred to as an outer end. In the arrangement shown in the figures, the inner-outer direction ML may be equivalent to the axial direction defined by the bearing block, the bearing and/or the transmission shaft.

Because the bearing is contained in the bearing block, it is difficult for both the inner end and outer end of the bearing to obtain sufficient lubricating oil through conventional splash lubrication, which may provide access to wear, pitting and even jam at the bearing of the gearbox during transmission, thereby seriously affecting the reliability and service life of the bearing and gearbox. Therefore, bearing failure is one of the main failure reasons of the gearbox adopting a conventional splash lubrication method. In order to supply sufficient lubricating oil to the bearing so as to efficiently lubricate the bearing, the gearbox according to the present utility model further includes a lubricating assembly 300 that is integrally joined to the inner surface 110 of the front housing 100. During operation of the gearbox, the lubricating oil may splash onto the inner surface 110 of the front housing 100 under the drive of the gear and flow downwardly under gravity, while the lubricating assembly 300 may block the lubricating oil and guide it to the lubricated sites, such as the bearing in the bearing block 120.

An embodiment of the lubricating assembly 300 disposed on the inner surface 110 of the front housing 100 is described below with reference to FIGS. 1-3. As shown in the figures, the gearbox according to the present utility model includes the lubricating assembly 300 disposed on the inner surface 110 of the front housing 100. The lubricating assembly 300 may include an oil deflector 310, a middle oil guide rib 320 and a side oil guide rib 330. The oil deflector 310 and the side oil guide rib 330 are generally positioned at one of the bearing blocks 120 so as to guide the lubricating oil toward the corresponding bearing block 120, while the middle oil guide rib 320 is generally positioned between the two bearing blocks 120 so as to dispense hydraulic oil between the two bearing blocks 120.

As shown in FIG. 1, the oil deflector 310 has a radial segment 311 extending radially from an outer surface of the first bearing block 121 (in a direction away from the outer surface) and a circumferential segment 312 extending circumferentially along the outer surface of the first bearing block 121. Therefore, the radial segment 311 may be generally linear, a small angle broken line-shaped, etc., while the circumferential segment 312 may be generally arc-shaped. In particular, the circumferential segment 312 is positioned on a lower side of the radial segment 311, which enables the lubricating oil blocked by the radial segment 311 to be guided downwardly by the circumferential segment 312. In particular, the radial segment 311 of the oil deflector 310 extends generally in the vertical direction.

As shown in FIG. 2, the middle oil guide rib 320 intersects with both the outer surface of the first bearing block 121 and the outer surface of the second bearing block 122. The middle oil guide rib 320 is provided with a first oil inlet hole 321 at the intersection with the outer surface of the first bearing block 121, and is provided with a second oil inlet hole 322 at the intersection with the outer surface of the second bearing block 122. The oil inlet holes 321 and 322 pass through the corresponding bearing block and extend to the bearing chamber 123, i.e., the oil inlet holes 321 and 322 provide access to the corresponding bearing chamber 123, so that the middle oil guide rib 320 can block the lubricating oil and guide it to the oil inlet holes 321 and 322, and the lubricating oil can pass through the oil inlet holes 321 and 322 and enter the corresponding bearing chamber 123 to lubricate the bearing therein.

By taking the first bearing block 121 as an example, as shown in the cross-sectional view taken along a line C-C in FIG. 1, for the shake of clarity, the bearings as well as the transmission shaft mounted into the bearing chamber 123 are shown in dashed lines in the cross-sectional view along C-C. After the bearing is mounted into the bearing chamber 123 of the first bearing block 121, the bottom (outer end) of the bearing is spaced apart from the bottom 124 of the bearing chamber 123 so that an oil collecting chamber 125 is formed between the bottom of the bearing and the bottom 124 of the bearing chamber 123 (i.e., a portion of the bearing chamber 123 close to the bottom 124 thereof), and the oil inlet hole 321 provides access to the oil collecting chamber 125. Under this configuration, the lubricating oil will enter the oil collecting chamber 125 through the oil inlet hole 321, while the lubricating oil in the oil collecting chamber 125 may lubricate the bearing and the shaft in the bearing chamber 123. It will be appreciated by those skilled in the art that although the above configuration is described by taking the first bearing block 121 as an example, this configuration is obviously also applicable to other bearing blocks.

As shown in FIG. 1 and FIG. 2, the oil inlet holes 321 and 322 are disposed to provide access to the bottom 124 of the corresponding bearing chamber 123. Under this configuration, the lubricating oil delivered by the oil inlet holes 321 and 322 will be delivered to the outer end of the corresponding bearing. It should be noted that the outer end of the bearing is one of the lubricating blind zones where it is most difficult to obtain the lubricating oil by conventional splash lubrication, so that this configuration enables the bearing to be lubricated more efficiently.

As shown in FIG. 2, the intersection of the middle oil guide rib 320 with the outer surface of the first bearing block 121 is located on lower sides of the oil deflector 310 as well as the intersection of the middle oil guide rib 320 and the second bearing block 122, so that the oil inlet hole 321 is positioned on a lower side of the oil deflector 310 and the oil inlet hole 322. Additionally, the circumferential segment 312 of the oil deflector 310 extends from the radial segment 311 toward the oil inlet hole 321 in the circumferential direction. Under this configuration, the lubricating oil guided by the oil deflector 310 and the middle oil guide rib 320 will be delivered primarily to the oil inlet hole 321 to lubricate the bearing in the first bearing block 121. This configuration is favorable when the gearbox is used as a reduction box because in this case, the size of an output gear carried by the driven shaft (i.e., the output shaft) that is assembled in the bearing in the second bearing block 122 is greater than that of an input gear carried by the driving shaft (i.e., the input shaft) assembled in the bearing in the first bearing block 121. Therefore, a part of the output gear is always kept below the liquid level of the lubricating oil and the input gear is always kept above the liquid level of the lubricating oil. As a result, the bearing in the second bearing block 122 can obtain the lubricating oil through the output gear, but the bearing in the first bearing block 121 have difficulty in obtaining the lubricating oil through the input gear, i.e., if there is no intervention, the bearing in the second bearing block 122 will obtain more lubricating oil than the bearing in the first bearing block 121. The configuration described above compensates for this imbalance by delivering more lubricating oil to the oil inlet hole 321, thereby enabling the bearing in the first bearing block 121 to obtain sufficient lubricating oil.

As shown in FIGS. 1-3, the middle oil guide rib 320 extends upwardly from the intersection with the outer surface of the first bearing block 121 (or the oil inlet hole 321) and passes through the intersection with the second bearing block 122 (or the oil inlet hole 322) to extend to the tail end 323 thereof. Therefore, the tail end 323 of the middle oil guide rib 320 is located on an upper side of the intersection thereof with the outer surface of the second bearing block 122 (or the oil inlet hole 322). The intersection of the middle oil guide rib 320 with the outer surface of the second bearing block 122 (or the oil inlet hole 322) is located on an upper side of the intersection thereof with the outer surface of the first bearing block 121 (or the oil inlet hole 321). Under this configuration, the middle oil guide rib 320 will block more lubricating oil and guide it to the oil inlet holes 321 and 322. It should be noted that the term "upper side" used herein, for example, the first structure being located on an upper side of the second structure means that the height of the position of the first structure (e.g., the distance between the first structure and the bottom of the internal chamber measured in the vertical direction VV') is greater than that of the position of the second structure (e.g., the distance between the second structure and the bottom of the internal chamber measured in the vertical direction VV'). Therefore, the so-called "upper side" encompasses the cases of "directly above", "obliquely above", etc., and the so-called "upwardly" encompasses the cases of "directly above", "obliquely above", etc. Additionally, the term "lower side" used herein, for example, the first structure being located on a lower side of the second structure means that the height of the position of the first structure (e.g., the distance between the first structure and the bottom of the internal chamber measured in the vertical direction VV') is less than that of the position of the second structure (e.g., the distance between the second structure and the bottom of the internal chamber measured in the vertical direction VV'). Therefore, the so-called "lower side" encompasses the cases of "directly below", "obliquely below", etc., and the so-called "downwardly" encompasses the cases of "directly below", "obliquely below", etc.

As shown in FIG. 1 and the section along C-C therein and FIG. 3, the first bearing block 121 and the second bearing block 122 are respectively provided a recess radially extending outwardly in a respective inner surface. The recess defines an auxiliary chamber 126 in fluid communication with the corresponding oil inlet holes 321 and 322. The auxiliary chamber 126 is in fluid communication with the corresponding oil collecting chamber 125, that is, the oil inlet holes 321 and 322 provide access to the corresponding auxiliary chamber 126, and the auxiliary chamber 126 provide access to the corresponding oil collecting chamber 125. Therefore, the lubricating oil delivered through the oil inlet holes 321 and 322 will flow into the auxiliary chamber 126 and then flow from the auxiliary chamber 126 into the corresponding oil collecting chamber 125 for lubricating the bearing in the corresponding bearing chamber 123. This configuration is favorable because the auxiliary chamber 126 not only increases the volume used to store the lubricating oil, but also can play a buffer role to enable the lubricating oil to flow more gently into the oil collecting chamber 125.

As shown in FIGS. 1 and 3, the auxiliary chamber 126 is adjacent to the bottom 124 of the bearing chamber 123. Under this configuration, the lubricating oil in the auxiliary chamber 126 may more smoothly enter the oil collecting chamber 125 that is also located at the bottom 124 of the bearing chamber 123.

As shown in FIGS. 2 and 3, the oil deflector 310 extends beyond the first bearing block 121 in the axial direction (i.e., the inner-outer direction ML), i.e., the width of the oil deflector 310 in the axial direction is greater than that of the first bearing block 121 in the axial direction. Under this configuration, the surface area of the oil deflector 310 is increased, which causes the oil plate 310 to block more lubricating oil and guide it to the oil inlet hole 321. Additionally, it should be noted that, under this configuration, the oil deflector 310, particularly a part of the lower surface of the circumferential segment 312 thereof, is located outside the first bearing block 121, so that the part can block the lubricating oil and guide it to the inner end of the bearing, so that the bearing obtains the lubricating oil from the inner end thereof. If this configuration is combined with a configuration where the oil inlet hole 321 provides access to the bottom 124 of the bearing chamber 123, thus the bearing in the first bearing block 121 obtains the lubricating oil from both the inner end and the outer end thereof, which enables the bearing to be lubricated more efficiently.

As shown in FIGS. 1-3, the circumferential segment 312 of the oil deflector 310 does not extend to the oil inlet hole 321, that is, the circumferential segment 312 of the oil deflector 310 is spaced apart from the oil inlet hole 321, which enables a part of the outer surface of the first bearing block 121 to be located between the circumferential segment 312 of the oil deflector 310 and the oil inlet hole 321. Under this configuration, when the lubricating oil on the circumferential segment 312 flows downwardly, a part of the lubricating oil may first come into contact with the outer surface of the first bearing block 121. Therefore, the part of the lubricating oil will also pull the other part of the lubricating oil onto the outer surface of the first bearing block 121 due to certain viscosity of the lubricating oil, which enables almost all the lubricating oil on the circumferential segment 312 to flow to the outer surface of the first bearing block 121, and to flow to the oil inlet hole 321 along the outer surface without causing the situation that because the circumferential segment 312 of the oil deflector 310 extends beyond the first bearing block 121. As a result, the lubricating oil on the circumferential segment 312 partially drips, and cannot be fully delivered to the oil inlet hole 321. Therefore, this configuration can ensure that a large amount of lubricating oil is reliably delivered to the oil inlet hole 321.

As shown in FIGS. 1-3, the side oil guide rib 330 extends upwardly from the intersection with the outer surface of the second bearing block 122 and is provided with, at the intersection, a third oil inlet hole 331. The third oil inlet hole 331 passes through the second bearing block 122 to extend to the bearing chamber 123, that is, the oil inlet hole 331 provides access to the bearing chamber 123 in the second bearing block 122. Under this configuration, the side oil guide rib 330 can guide the lubricating oil toward the oil inlet hole 331, while the lubricating oil will be delivered through the oil inlet hole 331 to the bearing chamber 123 in the second bearing block 122, thereby lubricating the bearing therein.

Similar to the first bearing block 121, the oil inlet hole 331 is disposed to provide access to the oil collecting chamber 125 located at the bottom 124 of the bearing chamber 123. Under this configuration, the lubricating oil delivered by the oil inlet hole 331 will be delivered to the outer end of the bearing, so that this configuration enables the bearing in the second bearing block 122 to be lubricated more efficiently.

Also similar to the first bearing block 121, the second bearing block 122 is also provided with, on the inner surface thereof, a recess radially extending outwards. The recess defines an auxiliary chamber 126 in fluid communication with the oil inlet hole 331. The auxiliary chamber 126 is in fluid communication with the oil collecting chamber 125 of the second bearing block 122. That is, the oil inlet hole 331 provides access to the auxiliary chamber 126, while the auxiliary chamber 126 provides access to the oil collecting chamber 125 of the second bearing block 122. Therefore, the lubricating oil delivered through the oil inlet hole 331 will flow into the auxiliary chamber 126 and then flow from the auxiliary chamber 126 into the oil collecting chamber 125, while the lubricating oil in the oil collecting chamber 125 may be used to lubricate the bearing in the bearing chamber 123 of the second bearing block 122. As above described, this configuration is favorable because the auxiliary chamber 126 not only increases the volume used to store the lubricating oil, but also can play a buffer role to enable the lubricating oil to flow more gently into the oil collecting chamber 125.

As shown in FIGS. 1 and 3, the auxiliary chamber 126 is adjacent to the bottom 124 of the bearing chamber 123 of the second bearing block 122. Under this configuration, the lubricating oil in the auxiliary chamber 126 may more smoothly flow into the oil collecting chamber 125 that is also located at the bottom 124 of the bearing chamber 123.

As shown in FIGS. 1-3, the tail end 323 of the middle oil guide rib 320 is located on an upper side of the intersection of the side oil guide rib 330 with the outer surface of the second bearing block 122 (or the oil inlet hole 331). Under this configuration, the tail end 323 of the middle oil guide rib 320 may avoid flow of the lubricating oil blocked by the side oil guide rib 330 to the oil inlet holes 321 and 322, thereby ensuring that sufficient lubricating oil is supplied to the bearing in the second bearing block 122 through the oil inlet hole 331.

Figure 4:
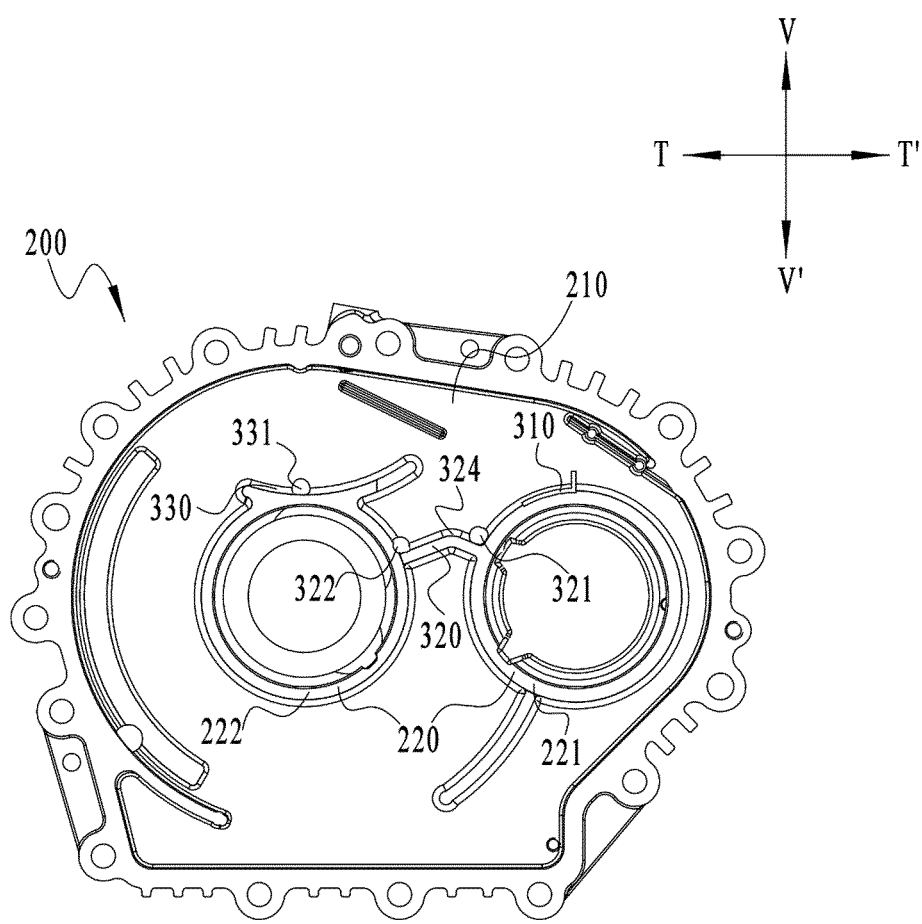
FIG. 4 is a schematic front view of a rear housing of the gearbox according to the present utility model.
Figure 5:
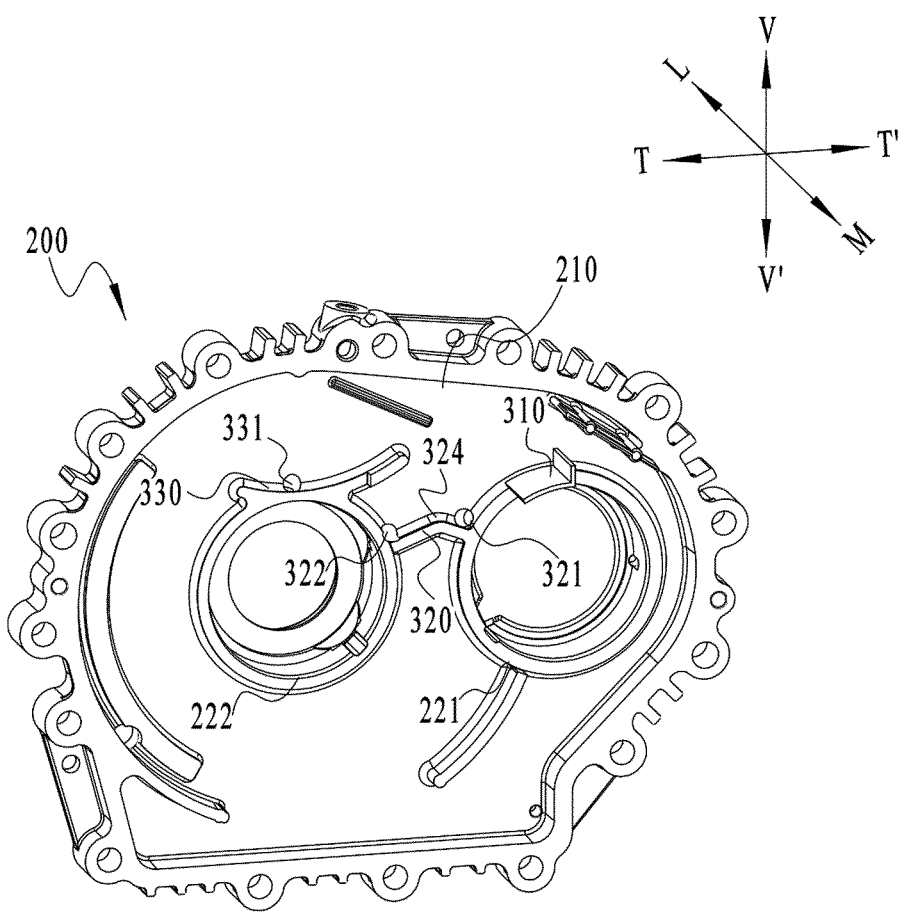
FIG. 5 is a schematic three-dimensional view of the rear housing of the gearbox according to the present utility model.
Figure 6:
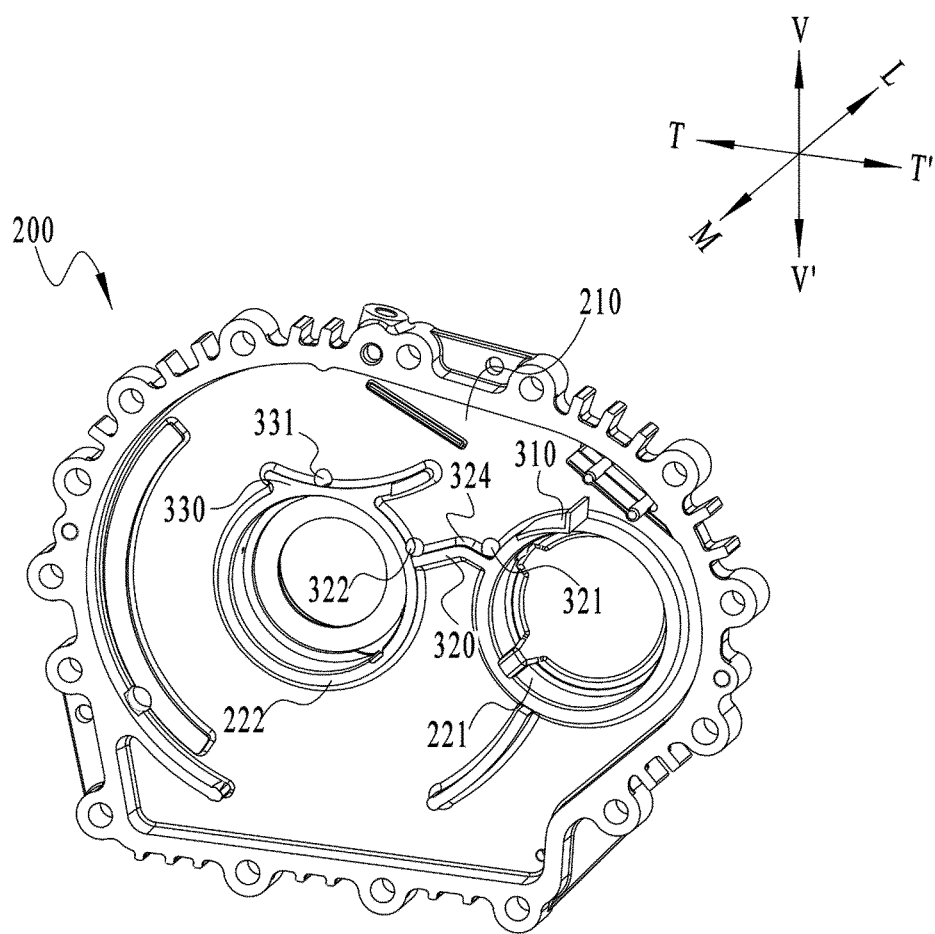
FIG. 6 is another schematic three-dimensional view of the rear housing of the gearbox according to the present utility model.

As shown in FIGS. 4-6, a schematic front view and a schematic three-dimensional view of the rear housing of the gearbox according to the present utility model are shown. The rear housing 200 may be provided with at least two generally circular bearing blocks 220 (e.g., a first bearing block 221 for accommodating a rear bearing of the driving shaft and a second bearing block 222 for accommodating a rear bearing of the driven shaft) protruding from the inner surface 210 thereof. The bearing block 220 may have the same configuration as the bearing block 120 on the front housing 100. In order to supply sufficient lubricating oil to the bearing in the bearing block 220 so as to effectively lubricate the bearing, the gearbox according to the present utility model further includes a lubricating assembly 300 that is integrally joined to the inner surface 210 of the rear housing 200. During operation of the gearbox, the lubricating oil may splash onto the inner surface 210 of the rear housing 200 under the drive of the gear and flow downwardly under gravity, while the lubricating assembly 300 may block the lubricating oil and guide it to the lubricated sites, such as the bearing in the bearing block 220.

An embodiment of the lubricating assembly 300 disposed on the inner surface 210 of rear housing 200 is described below with reference to FIGS. 4-6. It should be noted that the embodiment of the lubricating assembly 300 as shown in FIGS. 4-6 is generally the same as the embodiment of the lubricating assembly 300 as shown in FIGS. 1-3, which differ merely in the arrangement of the middle oil guide rib 320. Therefore, in addition to the middle oil guide rib 320, the features of the front housing 100 and the lubricating assembly 300 thereof described above with reference to FIGS. 1-3 are all suitable for the rear housing 200 and the lubricating assembly 300 thereof.

As shown in FIGS. 4-6, the middle oil guide rib 320 extends between the first bearing block 221 and the second bearing block 222. In other words, one end of the middle oil guide rib 320 is joined to the first bearing block 221, while the other end of the middle oil guide rib is joined to the second bearing block 222, and the intersections (i.e., both ends) with the outer surfaces of the two bearing blocks 220 are provided with the oil inlet holes 321 and 322. In addition, the middle oil guide rib 320 is provided with a protruding portion 324 hunching up between the two ends thereof, the protruding portion 324 being located on an upper side of the two ends (or the oil inlet holes 321 and 322) of the middle oil guide rib 320. Therefore, there is at least one common point with the embodiment as shown in FIGS. 1-3, i.e., a portion of the middle oil guide rib 320 adjacent the oil inlet holes 321 and 322 is located on the upper side of the oil inlet holes 321 and 322. Under this configuration, the middle oil guide rib 320 will block the lubricating oil and guide it to the two oil inlet holes 321 and 322. Particularly the lubricating oil on the right side of the protruding portion 324 will be guided to the oil inlet hole 321, while the lubricating oil on the left side of the protruding portion 324 will be guided to the oil inlet hole 322. Thus, by adjusting the positions of the protruding portion 324 relative to the two oil inlet holes 321 and 322, the amount of lubricating oil delivered to the two oil inlet holes 321 and 322 may be adjusted. For example, if the protruding portion 324 is close to the oil inlet hole 321, the amount of lubricating oil delivered to the oil inlet hole 322 is greater. If the protruding portion 324 is close to the oil inlet hole 322, the amount of lubricating oil delivered to the oil inlet hole 321 is greater. In the embodiment as shown in FIGS. 4-6, since the oil deflector 310 can help to deliver the lubricating oil to the oil inlet hole 321, the protruding portion 324 is positioned closer to the oil inlet hole 321 to enable the middle oil guide rib 320 to deliver more lubricating oil to the oil inlet hole 322.

An optional but non-limiting embodiment of the gearbox according to the present utility model is described in detail above by way of the drawings. For those of ordinary skill in the art, modifications and additions to techniques and structures as well as recombination of features in the embodiments are obviously considered to be included within the scope of the present utility model without departing from the spirit and essence of the present disclosure. Accordingly, these modifications and additions to be contemplated under the teachings of the present utility model should be considered as part of the present utility model. The scope of the present utility model includes equivalent techniques known to the filing date of the present utility model and equivalent techniques that have not been foreseen.

The invention claimed is:

1. A gearbox comprising a pair of housings,
wherein each respective housing of the pair of housings includes a bearing block protruding axially from an inner surface of the respective housing,
wherein a radial inner surface of each bearing block defines a bearing chamber configured to accommodate a bearing,
wherein at least one of the housings includes a lubricating assembly on the inner surface of the at least one of the housings, the lubricating assembly comprising:
an oil deflector having a radial segment extending from (i) a radial outer surface of the bearing block of the respective housing in a direction away from the radial outer surface, and (ii) a circumferential segment extending from the radial segment along the radial outer surface; and a middle oil guide rib intersecting with the radial outer surface of the bearing block of the respective housing, the middle oil guide rib having, at the intersection with the radial outer surface, an oil inlet hole configured to provide access to the bearing chamber, wherein the oil inlet hole is located on a lower side of the oil deflector, wherein the circumferential segment extends towards the oil inlet hole, and wherein a portion of the middle oil guide rib adjacent to the oil inlet hole is located on an upper side of the oil inlet hole.

2. The gearbox according to claim 1, wherein an axial width of the oil deflector is greater than an axial width of the bearing block.

3. The gearbox according to claim 2, wherein the circumferential segment of the oil deflector is spaced apart from the oil inlet hole.

4. The gearbox according to claim 1, wherein a portion of the bearing chamber adjacent to a bottom thereof forms an oil collecting chamber configured to accommodate lubricating oil, and the oil inlet hole is configured to provide access to the oil collecting chamber.

5. The gearbox according to claim 4, wherein:
the radial inner surface of the bearing block is provided with a recess, and
the recess defines an auxiliary chamber that is in fluid communication with the oil inlet hole and the oil collecting chamber.

6. The gearbox according to claim 1, wherein:
the bearing block is a first bearing block,
the oil inlet hole is a first oil inlet hole,
each respective housing of the pair of housings further comprises a second bearing block axially protruding from the inner surface of the respective housing,
the middle oil guide rib further intersects with a radial outer surface of the second bearing block, and the middle oil guide rib further includes, at the intersection with the radial outer surface of the second bearing block, a second oil inlet hole that is configured to provide access to a bearing chamber of the second bearing block, and
a portion of the middle oil guide rib adjacent to the second oil inlet hole is located on an upper side of the second oil inlet hole.

7. The gearbox according to claim 6, wherein the middle oil guide rib extends upwardly from the first oil inlet hole to the second oil inlet hole and extends upwardly from the second oil inlet hole to a tail end.

8. The gearbox according to claim 6, wherein:
the middle oil guide rib has a protruding portion, and
the middle oil guide rib extends upwardly from the first oil inlet hole to the protruding portion and extends downwardly from the protruding portion to the second oil inlet hole.

9. The gearbox according to claim 6, wherein:
the lubricating assembly further comprises a side oil guide rib,
the side oil guide rib intersects with the radial outer surface of the second bearing block, the side oil guide rib including, at the intersection with the radial outer surface of the second bearing block, a third oil inlet hole that is configured to provide access to the bearing chamber of the second bearing block, and
the side oil guide rib extends upwardly from the third oil inlet hole.

10. The gearbox according to claim 1, wherein the lubricating assembly is an integrated part of the pair of housings.

* * * * *